United States Patent
Groh et al.

(10) Patent No.: US 7,351,673 B1
(45) Date of Patent: Apr. 1, 2008

(54) LAMINATES INCLUDING TWO OR MORE LAYERS OF ORGANIC SYNTHETIC FILAMENT NON-WOVENS AND GLASS FIBER WEBS AND SCRIMS

(75) Inventors: Werner Groh, Schwabmünchen (DE); Michael Schöps, Großaitingen (DE); Willi Seiß, Faulbach (DE); Rolf Schwarz, Wertheim (DE); Monika Nagl, Augsburg (DE); Wofgang Greiser, Neusäß (DE); Michael Zeiner, Wertheim (DE); Jürgen Umminger, Lauda-Königshofen (DE)

(73) Assignee: Johns Manville, Denver, CO (US)

( * ) Notice: Subject to any disclaimer, the term of this patent is extended or adjusted under 35 U.S.C. 154(b) by 1626 days.

(21) Appl. No.: 09/619,531

(22) Filed: Jul. 19, 2000

(30) Foreign Application Priority Data

| Jul. 30, 1999 | (DE) | ................................ 199 35 408 |
| Jul. 30, 1999 | (DE) | ................................ 199 35 531 |
| Oct. 16, 1999 | (DE) | ................................ 199 50 057 |
| Oct. 30, 1999 | (DE) | ................................ 199 52 432 |
| Nov. 18, 1999 | (DE) | ................................ 199 55 713 |
| Nov. 18, 1999 | (DE) | ................................ 199 55 730 |

(51) Int. Cl.
*B32B 5/06* (2006.01)
*B32B 27/04* (2006.01)
*B32B 17/02* (2006.01)

(52) U.S. Cl. .................. 442/383; 442/149; 442/154; 442/180; 442/388; 442/389; 428/299.4; 428/300.7

(58) Field of Classification Search ................. 442/20, 442/26, 35, 43, 149, 180, 268, 270, 271, 442/273, 275, 277, 281, 381, 387, 388, 392, 442/402, 154, 331, 355, 374, 383, 389; 428/210, 428/299.4, 300.7, 417
See application file for complete search history.

(56) References Cited

U.S. PATENT DOCUMENTS

| 4,714,651 A | * | 12/1987 | Hartmann et al. | .......... 428/286 |
| 4,816,327 A | * | 3/1989 | Binnersley et al. | ......... 428/225 |
| RE33,023 E | * | 8/1989 | Hiers | .......................... 428/295 |
| 5,171,629 A | * | 12/1992 | Heidel et al. | ................ 428/285 |
| 5,571,596 A | * | 11/1996 | Johnson | ...................... 428/143 |
| 5,616,395 A | * | 4/1997 | Baravian et al. | ............ 428/102 |
| 6,235,657 B1 | * | 5/2001 | Schops et al. | ................ 442/57 |

FOREIGN PATENT DOCUMENTS

| DE | 26 22 206 | 12/1977 |
| DE | 3435 643 A1 | 4/1986 |
| DE | 3901 152 A1 | 7/1990 |
| DE | G 92 07 367.0 | 10/1992 |
| DE | 195 21 838 A1 | 12/1996 |
| DE | 195 43 991 A1 | 5/1997 |
| DE | 197 39 049 A1 | 3/1999 |
| EP | 0 132 325 B1 | 1/1985 |
| EP | 0 176 847 A2 | 4/1986 |
| EP | 0 187 824 B1 | 7/1986 |
| EP | 0 315 507 A2 | 5/1989 |
| EP | 0 379 100 B1 | 7/1990 |
| EP | 0 646 454 A1 | 4/1995 |
| EP | 0 806 509 A1 | 11/1997 |
| EP | 0 899 372 A2 | 3/1999 |
| JP | 0010246453 AA | 10/1989 |
| JP | 0070052299 AA | 2/1995 |
| WO | WO 97/19219 | 5/1997 |
| WO | WO 98/17455 | 4/1998 |

\* cited by examiner

*Primary Examiner*—Lynda Salvatore
(74) *Attorney, Agent, or Firm*—Robert D. Touslee

(57) ABSTRACT

In accordance with the invention, a laminate of two or more layers and the method of making it is provided. The laminate includes at least one organic synthetic filament non-woven layer, and at least one woven web or scrim of glass fibers pre-consolidated by a binding agent. The polyester non-wovens and the woven webs or scrims are bound by needling such that a part of the (e.g., polyester) filaments penetrate through the laminate and emerge at the lower surface of the laminate and lie adjacent thereto The formed laminate is subjected to a final consolidation by an acrylate or a styrene binder.

25 Claims, No Drawings

LAMINATES INCLUDING TWO OR MORE LAYERS OF ORGANIC SYNTHETIC FILAMENT NON-WOVENS AND GLASS FIBER WEBS AND SCRIMS

BACKGROUND OF THE INVENTION

1. Field of the Invention

The invention relates to a method of fabricating a laminate having two or more layers based on at least a organic synthetic filament non-woven and glass fiber woven web or scrim, and the product and use thereof.

2. Description of the Related Art

Laminates composed of bonded fabrics are useful in wall and floor coverings of constructions such as residential and commercial structures. They are particularly useful in the roofing felts and insulation, where the laminates are utilized as support material. The bonded fabrics find particular applicability as carrier in bituminized roofing felts and membranes. Naturally, these laminates can be coated with other materials such as polyvinyl chloride.

Various laminates fabricated on the basis of polyester filament non-wovens and a fabric made of glass fibers is known in the industry. For example, South African Patent Document ZA 94/02763 discloses laminates having two or more layers including a fabric of glass staple fibers and a non-woven of continuous filaments pre-consolidated by needling.

German Patent Document DE 195 21 838 A1 concerns a compact compound fabric which has at least three layers and wherein the intermediate layer is woven fabric of inorganic fibers.

German Patent Document DE 195 43 991 A1 discloses a woven web which is used as reinforcing structures in road construction. The non-woven web is a grid bound to a non-woven.

Finally, European Patent Document 0 806 509 A1 describes a carrier having a textile fabric which may be a non-woven of polyester and a reinforcement, wherein the reinforcement may include a scrim, a woven web, a non-woven, etc.

Some of the disadvantage associated with the laminate composites described above is the mechanical, dimensional and fire retardant properties of these composites when they are employed in bituminized roofing webs.

To meet the requirements of the roofing industry as well as the sealing, flooring and insulating industries, it is an object of the invention to provide a laminate having two or more layers including non-woven synthetic webs and woven webs of glass fibers or scrims of glass fibers, bound by needling and consolidated by a binder.

It is another object of the present invention to provide a laminate where the glass fragments formed during production are minimized, thus reducing the dust formed.

It is a further object of the present invention to provide laminates having two or more layers and exhibiting improved mechanical and dimensional stability.

It is yet another object of the present invention to provide a laminate which may be used in bituminized roofing webs having improved delamination and fire resistant properties.

Other objects and aspects of the invention will become apparent to one of ordinary skill in the art upon review of the specification and claims appended hereto.

SUMMARY OF THE INVENTION

In accordance with a first aspect of the invention, a laminate of two or more layers is provided. The laminate includes at least one organic synthetic filament non-woven layer, and at least one woven web or scrim of glass fibers pre-consolidated by a binding agent. The organic synthetic non-wovens and the woven webs or scrims are bound by needling such that a part of the polyester filaments penetrate through the laminate and emerge at the lower surface of the laminate and lie adjacent thereto. The formed laminate is subjected to a final consolidation by an acrylate or a styrene binder.

In accordance with a second aspect of the invention, a method for the production of laminates having two or more layers is provided. The process includes providing a woven web or scrim of glass fibers, wherein the web or scrim is pre-consolidated by a binding agent. The organic synthetic filament non-woven is placed on the pre-consolidated woven web or scrim. Optionally, the non-woven is placed on both sides of the woven web forming a sandwich arrangement. The woven and non-woven are bound together by needling such that a part of the organic synthetic filaments penetrate through the laminate and emerge at the lower surface of the laminate and lie adjacent thereto. The formed laminate is treated with an acrylate or a styrene binder to consolidate it.

DETAILED DESCRIPTION OF THE PREFERRED EMBODIMENTS OF THE INVENTION

The invention will now be described with reference to the exemplary embodiments thereof. In an exemplary embodiment of the invention, non-wovens synthetic and pre-consolidated woven webs or scrims of glass are bound together to form a laminate. The woven webs or scrims and the non-woven are bound by needling in a manner where part of the synthetic filaments may extend through the entire woven layer. The synthetic fibers are preferably shrunk through the application of heat, prior to needling.

The non-woven synthetic material can be staple fiber, but preferably filamentous fibers. These filamentous fibers are also known to those skilled in the art as "endless" fibers. The fibers are preferably organic synthetic fibers, such as polypropylene, polyester, polyamide and other commonly used man-made organic fibers.

The synthetic non-woven material can be pre-consolidated by calendering or needling. The woven mat can also be pre-consolidated by a binding agent. Suitable binding agents include polyvinylacetate, pure acrylate and other hydrophobic or binder containing a hydrophobic agent.

Needling is performed to bind the layers, wherein the stitches are placed at a density of about 30 to 50 stitches/ $cm^2$. The laminate undergoes a final consolidation with a binder selected from the group including pure acrylate, copolymers of styrene, butadiene, and acrylates. These binders provided can be mixed with duroplastic binding agents such as urea or melamine resins. Preferably, the laminate is consolidated by a coating of about 5 to 35 weight percent and preferably 14 to 18 weight percent of an acrylate or styrene binder.

In particular, the process can be carried out by forming a non-woven of endless fibers or filaments by the spunbond process described in DE-OS 24 60 755 and herein incorporated by reference in its entirety. Preferably, the fibers are selected from the group including poly(ethylene terephtalate), copolyester and preferably polyester. Thereafter, the fibers are pre-consolidated by hot calendering where the non-woven is thermally pre-consolidated. Alternatively, pre-consolidation by needling is performed where about 20 to 40 stitches per cm$^2$ are placed. The pre-consolidated non-woven of filaments has a basic weight of about 50 to 350 g/m$^2$, and preferably about 100 to 230 g/m$^2$.

The woven of glass fiber web or scrims is produced, e.g., by using continuous glass fibers in a warp direction (i.e., lengthwise direction) and glass staple fiber in the weft direction (i.e., transverse direction). Glass filaments are preferred as warp yarns, whereas staple fibers yarns or staple fiber tapes are preferred as weft yarns. The glass staple fibers preferably have a titer of 330 tex to 660 tex. It will readily be recognized by those skilled in the art that dtex or tex is a unit of measurement of g/10,000 m or g/1,000 m, respectively.

Naturally, the warp yarns can be produced from staple fibers or from fiber tapes, and glass filaments may be employed for weft yarns. A dense non-woven web is especially advantageous, thus the warp and weft yarns are selected accordingly. It is advantageous to choose weft and warp yarns, the titre of which differs by at least a factor of 2. In the exemplary embodiment, the warp yarn density preferred is about 1 to 8 yarns per cm. The woven web is further pre-consolidated by a binding agent selected from the group including polyvinylacetate, starch, urea or melamine resin.

The polyester non-woven is subsequently placed on the prepared woven web, where they are needled together placing 30 to 50 stitches per cm$^2$. The polyester filaments are advanced at a forward feed ratio of less than 14 mm/stroke in order for at least a part of the filaments to penetrate the woven of glass fibers to the side facing away from the synthetic non-woven where the filaments lie adjacent thereto. Additionally, performing the needling at the above-mentioned feed ratio reduces the damage to the laminate and in particular to the glass fibers.

The bounded laminate is subjected to a final consolidation, through the application of an acrylate or styrene binder. Preferably, the binder is utilized in an amount of about 5 to 35 weight percent, and more preferably about 14 to 18 weight percent. It will readily be understood that the weight referred to includes the weight of the glass fiber woven and the polyester filament non-wovens.

Although a final consolidation using the above-mentioned binder is utilized, it is nevertheless possible to consolidate the laminate with a reduced amount of binder, and if necessary entirely omit the binder. Thus, an amount of 10 percent, preferably 7.5 percent and most preferably 5 percent or less is employed.

The synthetic fibers may be thermally treated between temperature of about 140 to 220° C. Consequently, a subsequent treatment of the laminate does not generate additional shrinkage of the filaments of the non-wovens.

The synthetic fibers may be shrunk separately, and therefore, before a non-woven is produced using these shrunken fibers. Preferably, the organic synthetic fibers are shrunk when they are present in the form of a non-woven or in the form of corresponding layers. The shrinking may take place before a mechanical or hydro-dynamical pre-consolidation. Optionally, the non-woven is shrunk after a corresponding pre-consolidation. The shrinking is preferably performed by heating in an oven at temperature of about 140 to 220° C.

Additionally, shrinking is performed after the carrier non-woven has been bound. The carrier, however is shrunk prior to bituminizing or coating with materials such as bitumen type materials, PVC, etc. Thus, to produce a roofing felt the carrier is led through a hot liquid bitumen bath. Accordingly, the mechanical properties, and particularly the delamination properties of the laminate obtained by this process are improved. Further, the fire resistant properties are improved as a result of the relatively intact layers.

The two layer laminate manufactured in accordance with the invention, reduces the amount of glass fragments and dust produced, thus avoiding injury to the operator and reducing harm to the environment. Moreover, a lesser amount of glass dust generated provides process advantages during the final consolidation stage.

In accordance with another exemplary embodiment, a laminate having three layers (i.e., sandwich structure) is manufactured. In particular, a polyester filament non-woven forms the upper and lower layers, while the glass fiber woven web or scrim is the middle layer. The glass woven web or scrim is produced by using continuous glass fibers in a warp direction and glass staple fiber in the weft direction.

The woven glass web is pre-consolidated by a binding agent prior to bonding the synthetic non-woven by needling. The glass fibers can be chosen from the E, C, mixtures thereof, ECR glass, and suitable binding agents for treating the woven glass include polyvinylacetate and starch, urea or melamine resin. The filament synthetic non-woven is placed on the pre-consolidated woven web where the layers are bound by needling. Optionally, the polyester non-wovens are pre-consolidated by needling. Filaments of the first non-woven penetrate through the glass fiber woven web and through the optional second polyester non-woven disposed on the opposite side of the glass fiber web and which provides effective anchoring. In accordance with this embodiment, the needles utilized have a distance between the needle point and the barb of approximately 2 to 4 mm.

The laminates are produced by the method outlined above, with respect to the two layer laminate. In order to avoid rupturing or simply damaging the glass fibers, needling is performed at a forward feed ratio of less than 14 mm/stroke. The needles utilized in conjunction with the forward feed ratio of the stroke maintain a small draft. A draft, as herein defined, occurs when a needle sticks into the non-woven, thereby moving the non-woven in the direction the layers are conveyed. The draft in the needle machine of the preferred embodiment is preferably about 0-13 mm/stroke. Thus, maintaining a small draft provides the laminate with improved mechanical and flame retardant properties.

The laminate having three layers can be manufactured where the synthetic non-wovens have a different area weight. The ratio of the area weights of the two synthetic non-wovens is preferably 1:1 to 1:5, more preferably 1:1 to 1:3, and most preferably 1:1 to 1:2.

The invention will be further explained by the example provided below, wherein the laminate includes a non-woven synthetic layer and a woven glass layer.

EXAMPLE

A random fiber non-woven is produced by depositing polyethyleneterephtalate on a conveyor. Thereafter, the non-woven is pre-consolidated by needling and placing 33 stitches per cm$^2$. The non-woven had an area weight of 183 g/cm$^2$.

The non-woven was placed on a glass woven web which was pre-consolidated by a melamine resin. To manufacture the glass woven web, warp yarns including continuous glass filaments were used. The titre was 136 tex, the weft yarn was prepared on the basis of glass stable fibers and the titre was 330 tex. The warp density was four yarns per cm.

Thereupon, the two layers were bound by needling with 41 stitches per cm² at a feed ratio of 12 mm/stroke. Subsequently, the laminate was subjected to a final consolidation with a styrene binder. The maximum tensile load in machine direction was found to be 514 N/5 cm at 32.4 percent elongation and 457 N/5 cm at 35.8 percent in the cross direction.

While the invention has been described in detail with reference to specific embodiments thereof, it will be apparent to those skilled in the art that various changes and modifications can be made, and equivalents employed, without departing from the scope of the claims that follow.

The invention claimed is:

1. A laminate of two or more layers, comprising:
   at least one organic synthetic filament non-woven layer, and at least one woven web or scrim of glass fibers pre-consolidated by a binding agent,
   said at least one synthetic non-woven and said at least one woven web or scrim are bound by needling such that a part of the organic synthetic filaments penetrate through the laminate and emerge at the lower surface of the laminate and lie adjacent thereto; and
   wherein the formed laminate is subjected to a final consolidation by an acrylate or a styrene binder.

2. The laminate according to claim 1, wherein the binding agent is selected from the group consisting of polyvinylacetate, starch, urea and melamine.

3. The laminate according to claim 1, wherein said synthetic filaments are heat shrunk.

4. The laminate according to claim 1, wherein said synthetic filaments are thermally pre-consolidated by calendering.

5. The laminate according to claim 1, wherein said synthetic filament non-woven layer is pre-consolidated by needling.

6. The laminate according to claim 1, wherein said synthetic non-woven layer and said woven web or scrim are bound by needling having 30-50 stitches/cm².

7. The laminate according to claim 1, wherein said laminate, comprises about 5 to 35 weight percent acrylate or styrene binder based on the total weight of synthetic filament non-wovens and the glass woven web or scrim for final consolidation.

8. The laminate according to claim 1, wherein said laminate, comprises about 14 to 18 weight percent acrylate or styrene binder based on the total weight of synthetic filament non-wovens and the glass woven web or scrim for final consolidation.

9. The laminate according to claim 1, wherein said laminate is produced at a small draft in the needle machine.

10. The laminate according to claim 9, wherein, said draft is from about 0-13 mm/stroke.

11. The laminate according to claim 1, wherein the laminate includes two synthetic non-woven layers and a glass containing woven web, wherein the glass woven web includes weft and warp yarns, the titer of which differs by at least a factor of 2.

12. The laminate according to claim 1, wherein said glass woven web includes continuous glass filaments as warp yarns and glass staple fiber yarns as weft yarns.

13. The laminate according to claim 11, wherein the weft yarns are tapes.

14. The laminate according to claim 1, wherein the woven web or scrim contains glass fibers of E, C, mixtures thereof and ECR fibers.

15. A method for the production of a laminate according to claim 1, comprising:
   providing a woven web or scrim of glass fibers, wherein said web or scrim is pre-consolidated by a binding agent,
   placing a synthetic filament non-woven on said pre-consolidated woven web or scrim and optionally placing said non-woven on both sides of the woven web or scrim forming a sandwich arrangement,
   binding said woven and non-woven together by needling such that a part of the synthetic filaments penetrate through the laminate and emerge at the lower surface of the laminate and lie adjacent; and
   treating the formed laminate with an acrylate or a styrene binder to consolidate said laminate.

16. The method of claim 15, wherein said binding agent is selected from the group consisting of polyvinylacetate, starch, urea and melamine.

17. The method according to claim 15, wherein said synthetic filaments are heat shrunk.

18. The method according to claim 15, wherein said synthetic filament non-woven is thermally pre-consolidated by calendering or by needling.

19. The method according to claim 15, wherein pre-consolidation needling or binding by needling is performed using needles having a distance between the needle point and first barb of about 2 to 4 mm.

20. The method according to claim 15, wherein said needling is executed at a forward feed ratio of less than 14 mm/stroke.

21. The method according to claim 15, wherein said needling is executed at a small draft.

22. The method according to claim 21, wherein draft is about 0 to 13 mm/stroke.

23. The method according to claim 15, wherein a woven web or scrim includes fibers of C, E, mixtures thereof and ECR glass.

24. Bituminized roofing webs or sealing membranes containing the laminate of claim 1 as a carrier web.

25. Bituminized roofing webs or sealing membranes containing the laminate produced by the method of claim 15 as a carrier web.

* * * * *